United States Patent
Nash et al.

(10) Patent No.: US 9,599,489 B2
(45) Date of Patent: Mar. 21, 2017

(54) FIBRE OPTIC SENSOR ARRAY

(75) Inventors: Philip John Nash, Surrey (GB); Roger Ian Crickmore, Dorset (GB); David John Hill, Dorset (GB); Jonathan Westhall, Hampshire (GB)

(73) Assignee: OPTASENSE HOLDINGS LTD. (GB)

(*) Notice: Subject to any disclaimer, the term of this patent is extended or adjusted under 35 U.S.C. 154(b) by 2333 days.

(21) Appl. No.: 12/282,784

(22) PCT Filed: Mar. 8, 2007

(86) PCT No.: PCT/GB2007/000810
§ 371 (c)(1),
(2), (4) Date: Sep. 12, 2008

(87) PCT Pub. No.: WO2007/110574
PCT Pub. Date: Oct. 4, 2007

(65) Prior Publication Data
US 2009/0080828 A1 Mar. 26, 2009

(30) Foreign Application Priority Data
Mar. 25, 2006 (GB) .................................. 0606010.7

(51) Int. Cl.
G02B 6/00 (2006.01)
G01D 5/353 (2006.01)
(52) U.S. Cl.
CPC ..... *G01D 5/35383* (2013.01); *G01D 5/35303* (2013.01)

(58) Field of Classification Search
CPC ................................................. G01D 5/35383
See application file for complete search history.

(56) References Cited

U.S. PATENT DOCUMENTS

| 4,648,083 A | 3/1987 | Giallorenzi |
| 5,191,458 A | 3/1993 | Lyons et al. |
| 5,231,611 A | 7/1993 | Laznicka |
| 5,247,490 A | 9/1993 | Goepel et al. |
| 5,442,720 A | 8/1995 | Shaw |

(Continued)

FOREIGN PATENT DOCUMENTS

| WO | WO 97/36150 | 10/1997 |
| WO | WO 00/12977 | 3/2000 |

(Continued)

*Primary Examiner* — Sung Pak
*Assistant Examiner* — Hoang Tran
(74) *Attorney, Agent, or Firm* — McDonnell Boehnen Hulbert & Berghoff LLP

(57) ABSTRACT

A fiber-optic sensor array (100) comprises a line array of fiber-optic sensor packages (AX, BX, CX, DX, AY, BY, CY, DY, AZ, BZ, CZ, DZ) each having a package input/output (i/o) fiber and each being arranged to output a finite output pulse series of optical output pulses via the package i/o fiber in response to input thereto of one or more interrogating optical pulses. The array further comprises a fiber-optic bus (104, 106, 108, 110) extending along the length of the line array, each package i/o fiber being optically coupled to the fiber-optic bus at a respective positions along the line array. The array allows interrogation at a higher frequency than is the case for a serial array of the same number of fiber-optic sensing packages.

19 Claims, 18 Drawing Sheets

(56) References Cited

U.S. PATENT DOCUMENTS

| | | | |
|---|---|---|---|
| 5,866,898 A | 2/1999 | Hodgson et al. | |
| 5,946,429 A | 8/1999 | Huang et al. | |
| 6,040,571 A | 3/2000 | Hodgson et al. | |
| 6,084,233 A * | 7/2000 | Hodgson et al. | 250/227.14 |
| 6,208,590 B1 * | 3/2001 | Kim et al. | 367/149 |
| 6,282,334 B1 * | 8/2001 | Hodgson | G01H 9/004 |
| | | | 250/227.14 |
| 6,449,046 B1 * | 9/2002 | Huang et al. | 356/478 |

FOREIGN PATENT DOCUMENTS

| | | |
|---|---|---|
| WO | WO 00/62021 | 10/2000 |
| WO | WO 03/071309 | 8/2003 |

* cited by examiner

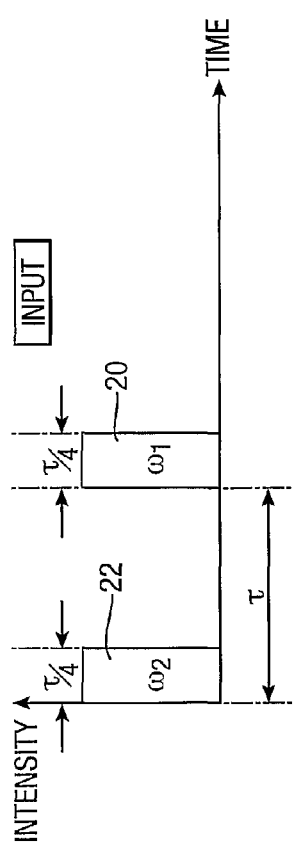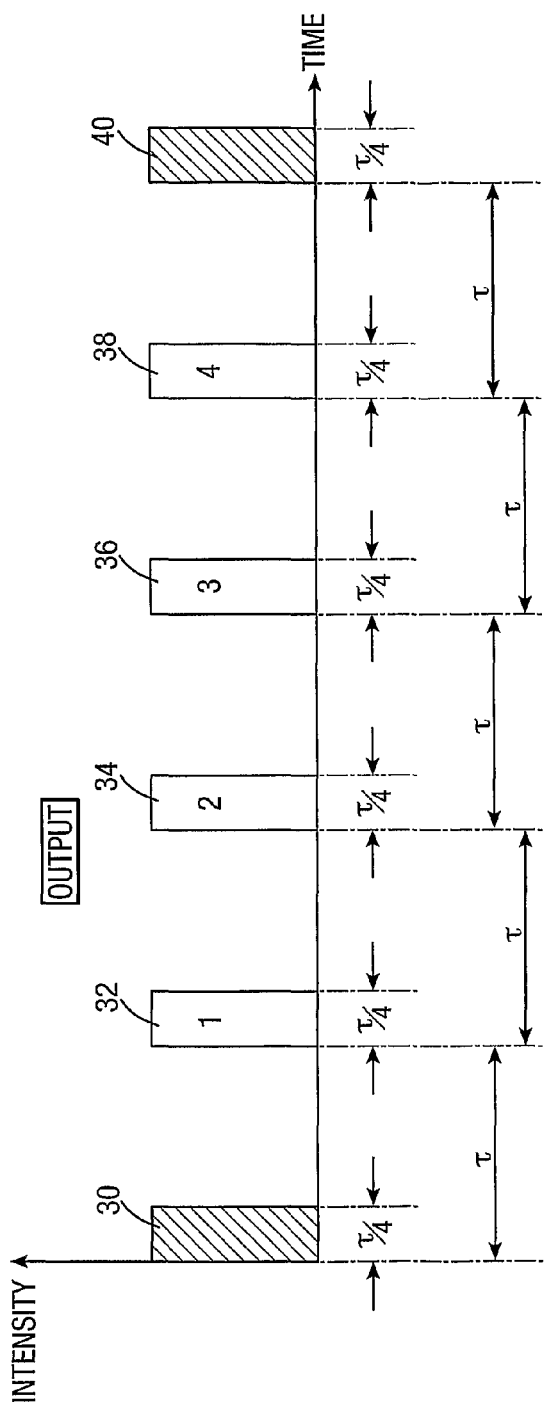

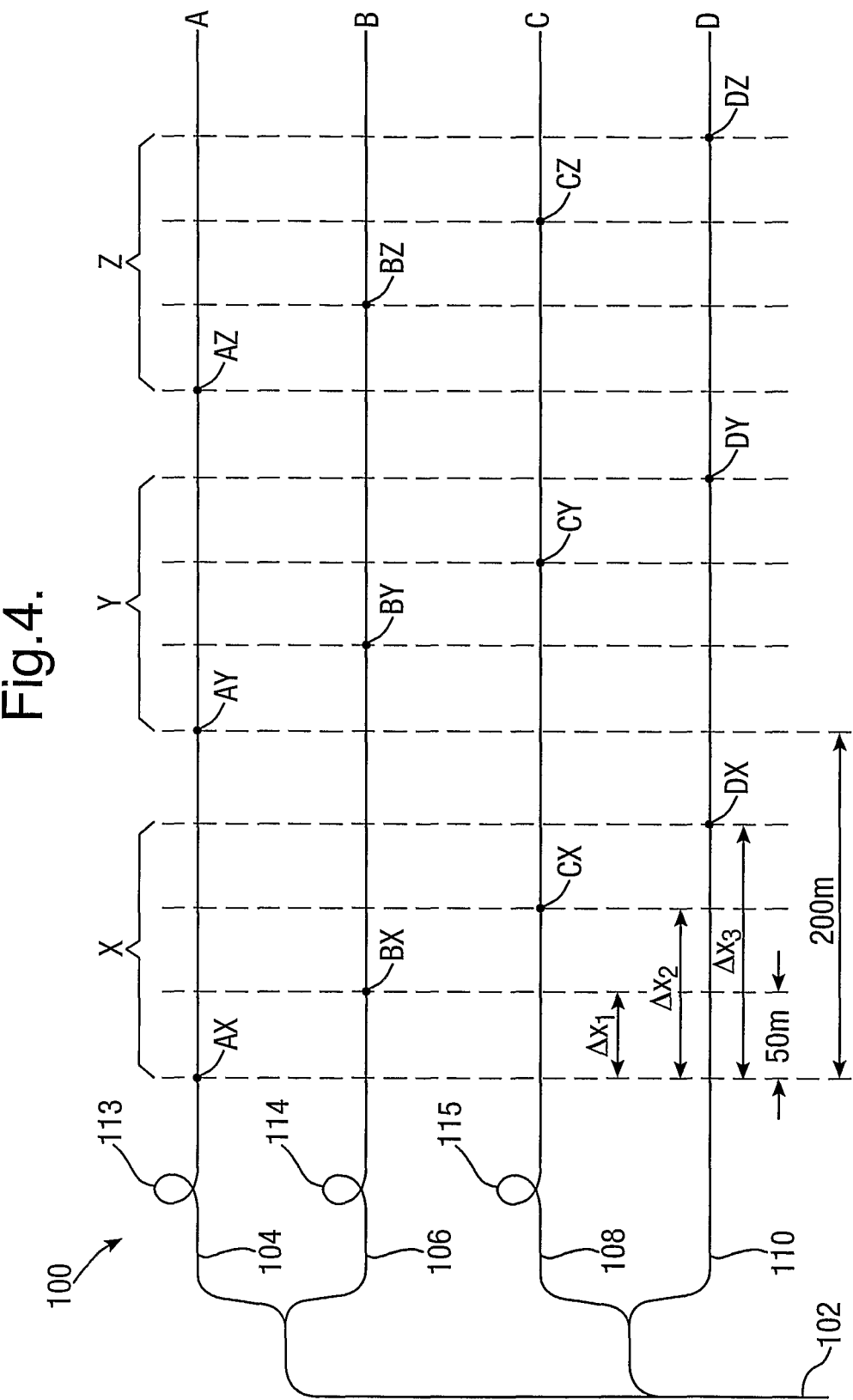

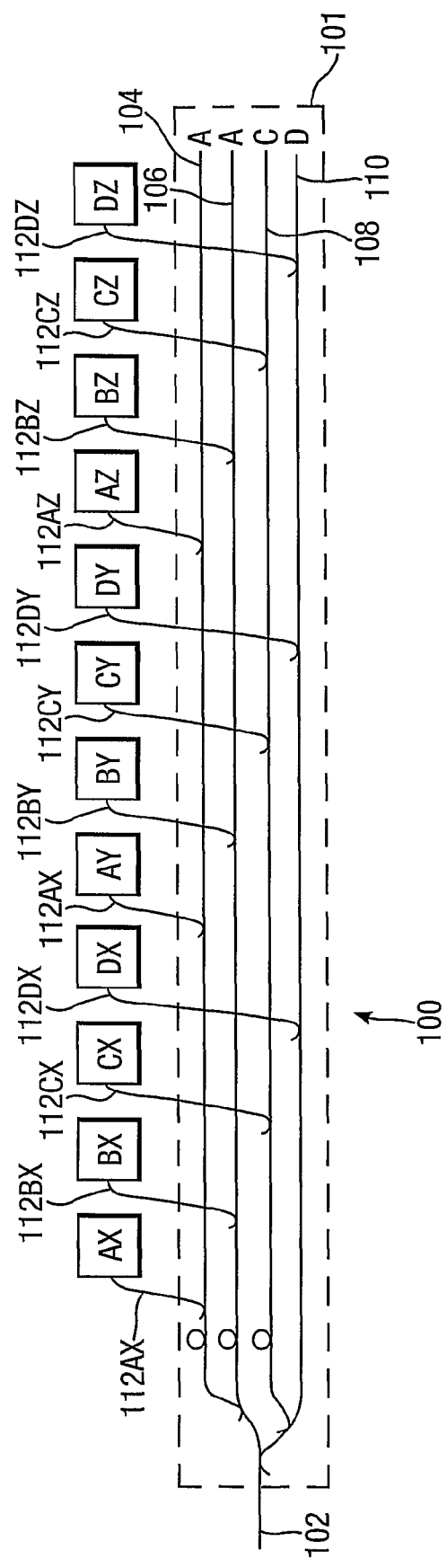

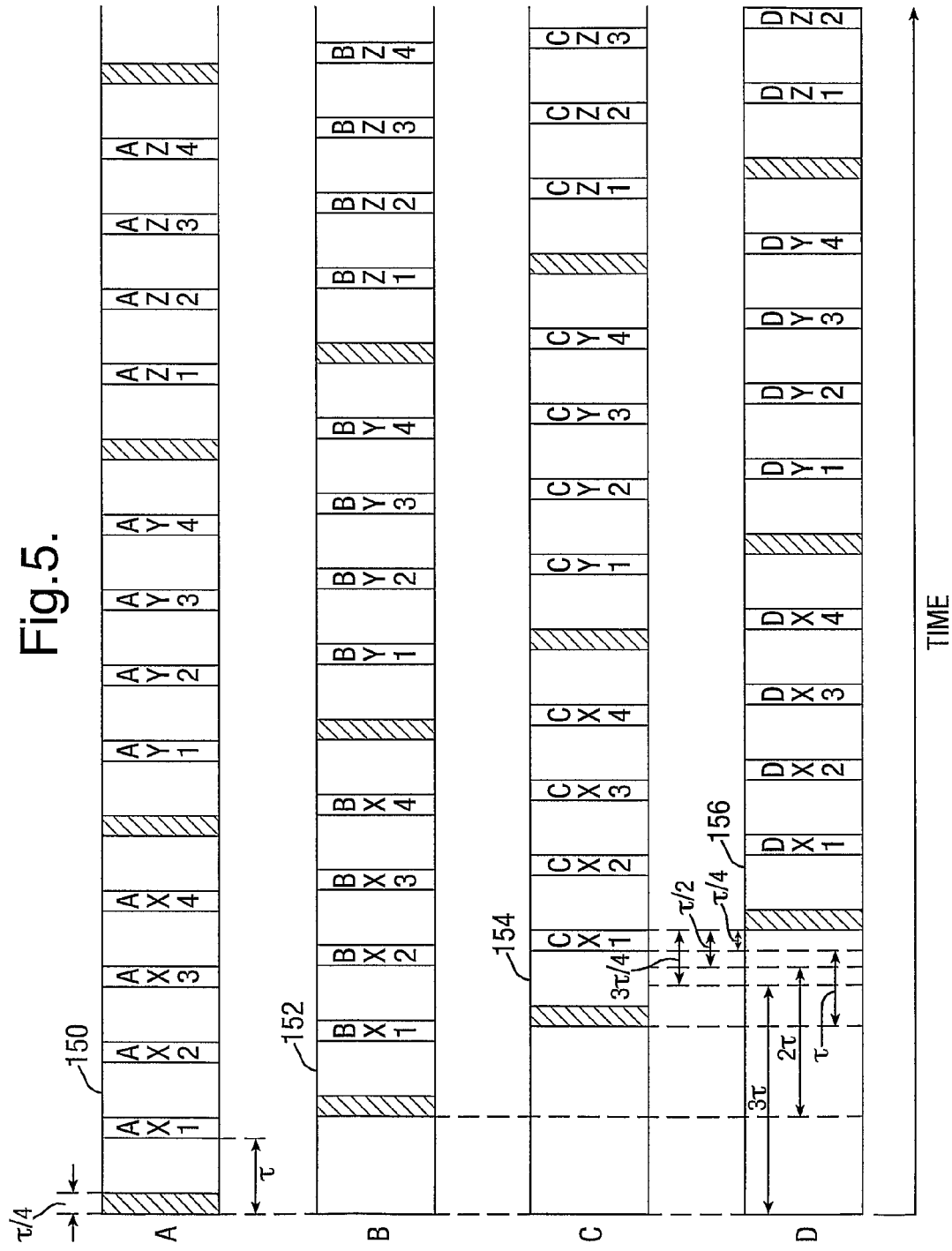

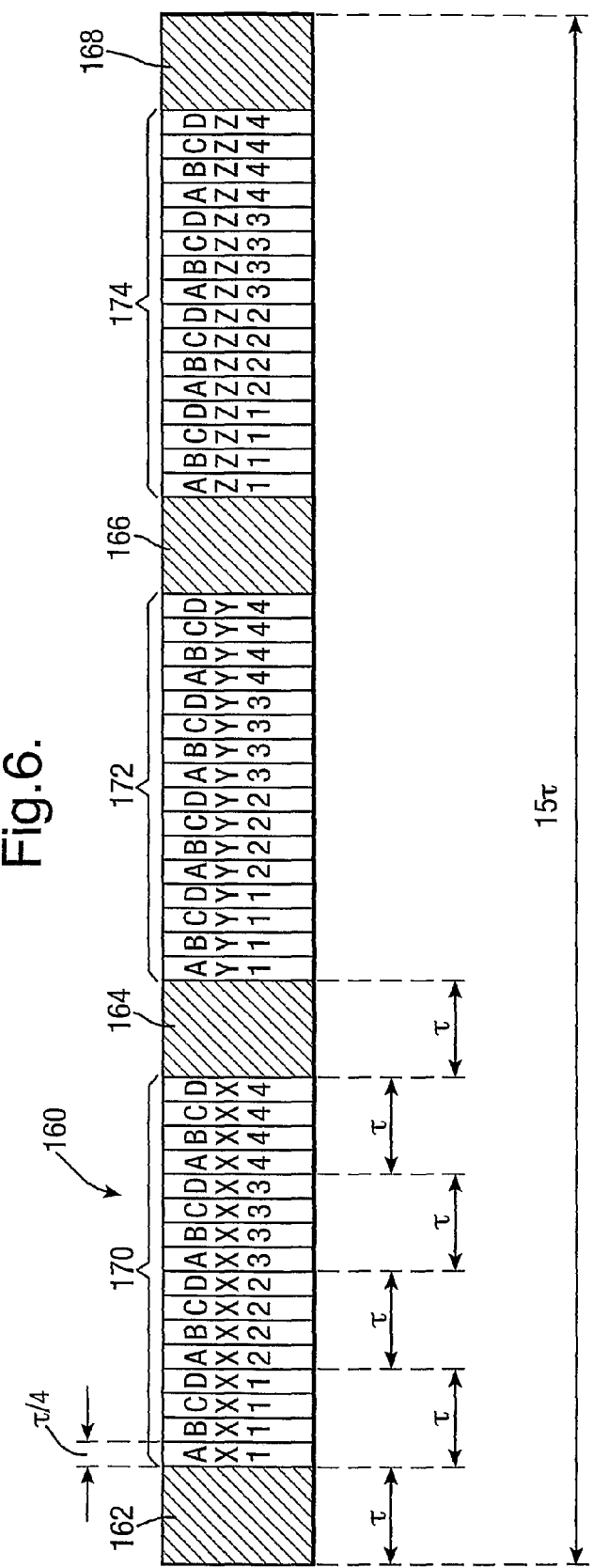

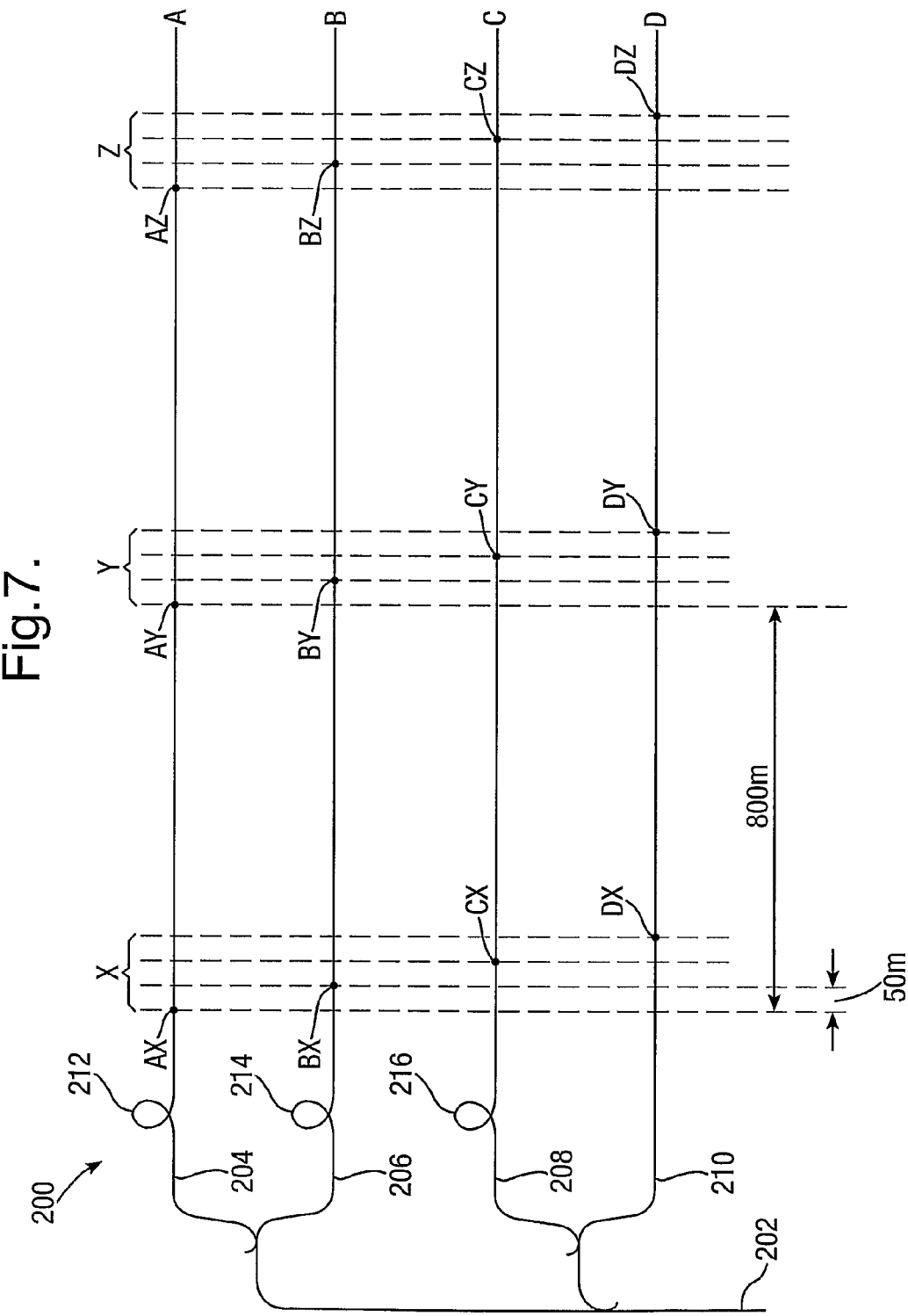

FIBRE OPTIC SENSOR ARRAY

BACKGROUND OF THE INVENTION (1) Field of the Invention

The invention relates to arrays of fibre-optic sensors.

(2) Description of the Art

A fibre-optic sensor package of a known type comprises a package input/output (i/o) fibre and one or more individual fibre-optic sensors, and is arranged to output a finite output pulse series of optical output pulses via the i/o fibre in response to input of one or more interrogating pulses input to the package i/o fibre. Depending on the particular structure of a package, the output pulse series may carry information relating to the temperature, pressure, acceleration etc of the surrounding environment. Such packages typically have an output fibre which allows a portion of one or more interrogating pulses to pass through the package to a second such package which is optically coupled to this portion of fibre, thus providing interrogation of the second package. Many packages may be connected in series to form a line array suitable for gathering information on physical conditions along the line array. In use of the array, one or more interrogating pulses are introduced into an input end of the array and output pulse series from respective packages of the array are output towards the input end of the array.

A problem with such arrays of fibre-optic sensing packages is that in the case of long arrays, having for example several hundred packages arranged in series, the maximum interrogation rate of the array is unacceptably low in certain applications (for example in detection of rapidly changing physical conditions) due to the fact that this rate is fixed by the time taken for a portion of one or more interrogating pulses to reach the last package of the array, and for an output pulse series from the last package to return through every other package to reach the input end of the array.

SUMMARY OF THE INVENTION

It is an object of the invention to ameliorate this problem. According to the invention, this object is achieved by a fibre-optic sensor array comprising a line array of fibre-optic sensor packages each having a package input/output (i/o) fibre and each being arranged to output a finite output pulse series of optical output pulses via its package i/o fibre in response to input thereto of one or more interrogating optical pulses, and wherein the array further comprises a fibre-optic bus extending along the length of the line array, each package i/o fibre being optically coupled to the fibre-optic bus at a respective position along the line array. Interrogation of each package of an array of the invention is achieved faster than in the case of a serial array because pulses which interrogate a particular package do not first have to pass through other packages of the array. Similarly an output pulse series from a particular package does not have to pass through other packages in the array in order to reach the input end of the array. A complete cycle of output pulse series (having one series from each package) arising from a single interrogation of an array of the invention therefore has a shorter duration than a complete cycle from an array having the same number of fibre-optic sensing packages arranged in series, providing for interrogation at a higher frequency than is the case in the prior art.

Preferably the fibre-optic sensor array further comprises an array i/o fibre and the fibre-optic bus comprises N bus fibres optically coupled in parallel to the array i/o fibre and extending along the length of the line array, the package i/o fibre of the nth fibre-optic sensor package of the line array being optically coupled to the kth bus fibre (k=1 to N) if n/N=M+k/N, and M is a positive integer or zero. For example if N=4, the tenth fibre-optic sensor package along the array is coupled to the second bus fibre. This allows groups of output pulse series coupled onto different bus fibres to be interleaved when multiplexed onto the array i/o fibre, further reducing the duration of a complete cycle of output pulse series arising from a single interrogation of the array, and allowing a further increase in the maximum interrogation rate of the array. Also, in the event of one of the bus fibres being damaged, the effect on the performance of the array is less than would be the case if all packages were coupled to a single bus fibre, or than would be the case if there were N bus fibres and the line array were made up of sets of N consecutive packages, the packages of a given set being coupled to the same bus fibre.

Preferably, positions along a given bus fibre at which package i/o fibres are coupled to thereto are separated by equal lengths of bus fibre, and at least one bus fibre incorporates a delay length of optical fibre between the array i/o fibre and the position along the bus fibre at which the package i/o fibre of the first package of that bus fibre is coupled. This allows the physical positions of packages along the array to be independently chosen to meet particular sensing requirements whilst still allowing interleaving of groups of output pulse series which are output onto different bus fibres by making suitable choices for the lengths of delay fibre.

Preferably, each of the fibre-optic sensor packages is arranged to output optical pulses of an output pulse series at a rate $1/\tau$, each pulse having a duration $\tau/N$, and the one or more delay lengths of fibre are such that, in use of the array, groups of output pulse series coupled into respective bus fibres form a multiplexed output sequence in the array i/o fibre, the sequence comprising a plurality of groups in which consecutive groups have a relative delay $\tau/N$. In this case individual pulses within output pulse series from corresponding packages coupled to different bus fibres are interleaved in the array i/o fibre to form a contiguous set of pulses, further reducing the amount of time within a single cycle of output data from the array during which no useful output is present.

If each package of the array produces an output pulse series of m individual pulses at a rate $1/\tau$ upon interrogation, each pulse having a duration $\tau/N$ and carrying useful information, then preferably the lengths of fibre connecting adjacent packages on any particular bus fibre have a length $cpm\tau/2$, where p is an integer, $p \geq 1$ and c is the speed of light in fibre. This produces a delay $pm\tau$ between output pulse series arising from adjacent packages coupled to a particular bus fibre and generated in response to a single interrogation. If p=1 then output pulse series arising from adjacent packages coupled to a particular bus fibre are contiguous in time. If p>1 there is a delay between the end of an output pulse series from one package and the start of an output pulse series from an adjacent package coupled to the same bus fibre, the two series arising from a single interrogation. However, the duration of this delay allows contiguous output pulse series to be obtained from any bus fibre by making an appropriate choice for the rate at which the array is interrogated. The lengths of fibre connecting adjacent packages on any particular bus fibre may incorporate respective delay lengths of fibre in order to allow the physical separation of packages coupled to a bus fibre to be chosen to meet particular sensing requirements, whilst simultaneously retaining this advantage.

Certain fibre-optic sensing packages produce an output series in response to interrogation in which the first and last optical pulses of the series carry no useful information. If the array has packages of this type, and the packages each produce m pulses of duration $\tau/N$ at a rate $1/\tau$ within each output pulse series, then preferably the lengths of fibre connecting adjacent packages on any particular bus fibre have a length $cp(m-1)\tau/2$, where p is an integer, $p\geq 1$ and c is the speed of light in fibre. If p=1 there is a delay $p(m-1)\tau$ between output pulse series from adjacent packages coupled to a particular bus fibre in response to a single interrogation. This means that the last pulse of one output pulse series overlaps in time with the first pulse of the next series, reducing the time within a complete output cycle of the array (and within a group of output pulse series from any single bus fibre) during which no useful information is conveyed. If p>1, there is a delay $p(m-1)\tau$ between the end of an output pulse series from one package and the start of an output pulse series from an adjacent package, the two series being generated in response to a single interrogation. Again, this delay allows contiguous output pulse series to be obtained from any bus fibre by making an appropriate choice for the rate at which the array is interrogated. In addition, the last output pulse of one series overlaps with the first pulse of the next series. Again, the lengths of fibre connecting adjacent packages on any particular bus fibre may incorporate respective delay lengths of fibre in order to allow the physical separation of packages coupled to a bus fibre to be chosen to meet particular sensing requirements, whilst retaining this advantage.

The fibre-optic sensing packages of the array may each comprise a serial arrangement of m−2 fibre-optic sensing coils, each coil having a length $c\tau/2$, and wherein each of said coils is provided with a partial reflector on an input side thereof and wherein the package is provided with a terminal reflector. Such a package may be interrogated by a pair of pulses of duration $\tau/N$, one pulse being delayed by $\tau$ with respect to the other, to produce an output pulse series of m pulses. The first and mth pulses carry no useful information, but the $2^{nd}$, $3^{rd}$, ... (m−1)th pulses may carry information on physical conditions in the vicinity of the package.

The reflectors may be fibre-coupled reflectors, or alternatively in-fibre reflectors such as in-fibre Bragg gratings.

One or more of the sensing coils may be comprised in one or more respective fibre-optic accelerometers or hydrophones to provide an array suitable for detecting vibration or pressure. In a package having four sensing coils, three coils may be comprised in respective fibre-optic accelerometers and one coil in a fibre-optic hydrophone to provide a fibre-optic sensor array for underwater surveying applications.

Preferably the fibre-optic bus is contained within a protective cable to prevent damage to the array during deployment or use.

A plurality of fibre-optic sensor arrays of the invention may be comprised in a large-scale fibre-optic sensor array in which individual arrays of the invention act as sub-arrays, each operating at a different wavelength. A wavelength multiplexer/demultiplexer may be used to couple radiation of a given wavelength between a corresponding sub-array and an i/o fibre of the large-scale array.

The invention extends to methods, apparatus and/or use substantially as herein described with reference to the accompanying drawings.

Any feature in one aspect of the invention may be applied to other aspects of the invention, in any appropriate combination. In particular, method aspects may be applied to apparatus aspects, and vice versa.

DESCRIPTION OF THE FIGURES

Embodiments of the invention are described below by way of example only and with reference to the accompanying drawings in which:

FIG. 2 shows a pair of pulses suitable for interrogating the FIG. 1 package;

FIG. 3 shows an output pulse series obtainable from the FIG. 1 package in response to input of the pulse pair of FIG. 2;

FIG. 4 schematically illustrates a first example fibre-optic sensor array of the invention;

FIG. 4A illustrates the physical arrangement of the FIG. 4 array;

FIG. 5 shows the timing of groups of output pulse series coupled into bus fibres of the FIG. 4 array in the case where delay coils of the array have zero length;

FIG. 6 shows a multiplexed output sequence obtainable from the FIG. 4 array when the delays coils thereof have suitable lengths;

FIG. 7 schematically illustrates a second example fibre-optic sensor array of the invention;

DESCRIPTION OF THE INVENTION

Figure 1:
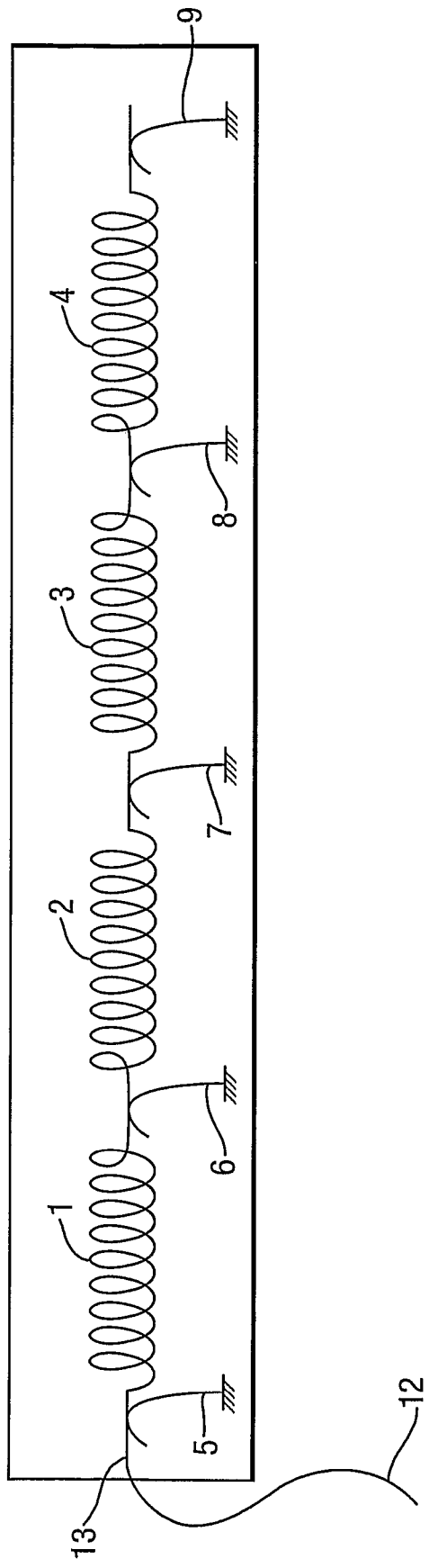
FIG. 1 shows a known type of fibre-optic sensor package.

In FIG. 1, a known type of fibre-optic sensor package, indicated generally by 10, comprises four individual fibre-optic sensing coils 1, 2, 3, 4 arranged in series. The coils 1, 2, 3, 4 are formed from a single length 13 of optical fibre, a portion 12 of which serves as the package input/output (i/o) fibre. Fibre-coupled mirrors 5, 6, 7, 8, 9 are coupled to the optical fibre 13 at respective locations along it such that each of the coils 1, 2, 3, 4 has a fibre-coupled-mirror coupled at each end of it. Coils 1, 2, and 3 could, for example, form parts of respective corresponding fibre-optic accelerometers with coil 4 forming part of a hydrophone to form a four-component package suitable for seismic surveying applications. (Mechanical parts of the package 10 are not shown in FIG. 1). Each of the coils 1, 2, 3, 4 has a length of 40 m. The total length of the fibre 13 of the sensor 10 is therefore 160 m (ignoring the small length of the i/o fibre 12 and the small connecting lengths of fibre between adjacent coils).

Referring to FIG. 2, a single interrogation of the package 10 of FIG. 1 may carried out by introducing an interrogating pair of optical pulses 20, 22 into the package i/o fibre 12. Pulses 20, 22 have respective frequencies $\omega_1$, $\omega_2$ and pulse 22 is delayed by $\tau=2l/c$ with respect to pulse 20, l being the length of coil in the sensor 10 (40 m) and c being the speed of an optical pulse in the fibre 9 (assumed to be $2\times10^8$ ms$^{-1}$ for the purposes of this description), hence $\tau$=400 ns. Each of the pulses 20, 22 has a duration $\tau/4$=100 ns. Referring to FIG. 3, the package 10 outputs an output pulse series of six pulses 30, 32, 34, 36, 38, 40 in response to input of the pulses 20, 22. Each of the pulses 30, 32, 34, 36, 38, 40 has a duration $\tau/4$=100 ns and there is a delay $\tau$ between consecutive pulses. Pulse 30 is generated by a portion of pulse 20 being reflected from the fibre-coupled mirror 5 of the package 10. Pulse 40 is generated by a portion of pulse 22 being reflected from fibre-coupled mirror 9. Each of pulses 32, 34, 36, 38 consists of a portion of pulse 20 coincident with a portion of pulse 22. For example, pulse 34 is made up of a portion of pulse 22 reflected from fibre-coupled mirror 6 and a portion of pulse 20 reflected from fibre-coupled mirror 7. A phase difference between these two pulse portions arises due to a phase-shift experienced by the portion of pulse 20 as it makes a double pass through sensing coil 2. By observing the phase or frequency of a beat signal generated when the second pulse of each of a plurality of output pulse series is incident on a photodetector (in response to multiple interrogating pulse pairs), information on physical conditions near the package 10 may obtained. (Exactly what the phase or frequency of the beat signal corresponds to depends on the type of individual sensor of which the coil 2 is a part). Similar considerations apply to pulses 34, 36 and 38. Output pulses 32, 34, 36, 38 are thus the outputs of individual sensors comprising coils 1, 2, 3, 4 respectively. Output pulses 30, 40 carry no useful information.

FIG. 4 schematically illustrates a first example fibre-optic sensor array 100 of the invention. The array 100 comprises an array input/output (i/o) fibre 102 optically coupled to four bus fibres 104, 106, 108, 110, labelled A, B, C and D respectively. Branches A, B and C incorporate delay loops 113, 114 and 115 respectively. Each of the bus fibres A, B, C, D has three packages of the type shown in FIG. 1 optically coupled to it at intervals of 200 m. The packages coupled to bus fibres B, C and D are offset along the length of the array 100 by distances of $\Delta x_1$=50 m, $\Delta x_2$=100 m, and $\Delta x_3$=150 m respectively from those coupled to bus fibre A. The packages of the array 100 are grouped into three clusters X, Y, Z each containing four packages—one coupled to each of the bus fibres A, B, C, D. The array 100 thus comprises 12 packages AX, BX, . . . CZ, DZ of the type shown in FIG. 1. The positions at which the packages are coupled to the bus fibres A, B, C, D of the array 100 are also indicated by the reference signs AX, BX, . . . CZ, DZ in FIG. 4 (the packages themselves are not shown in FIG. 4).

FIG. 4A shows the physical arrangement of the array 100. The packages AX, BX, . . . CZ, DZ form a line array; bus fibres A, B, C, D extend along the length of the line array and are housed in a protective cable 101. The first, fifth and ninth packages along the line array (AX, AY, AZ respectively) are coupled to bus fibre A. The second, sixth and tenth packages along the line array (BX, BY, BZ respectively) are coupled to the bus fibre B. The third, seventh and eleventh packages along the line array (CX, CY, CZ respectively) are coupled to bus fibre C. The fourth, eighth and twelfth packages (DX, DY, DZ) are coupled to bus fibre D. If one bus fibre before the first package thereof, the set of packages attached to it cannot be interrogated, although the effect of such breakage on the performance of the array 100 is less significant than would be the case if groups of four adjacent packages were to be coupled to each of three bus fibres with a spacing of 800 m between adjacent groups.

In use, the array 100 is interrogated by a series of pulse pairs, each as shown in FIG. 2, which are introduced into the array input/output (i/o) fibre 102. Following input to i/o fibre 102, each pair is divided into four portions; one portion being input to each of the bus fibres A, B, C, D. Output pulse series coupled into a given bus fibre form a group of output pulse series in that bus fibre; groups from respective bus fibre are multiplexed in the array i/o fibre 102 to form a multiplexed output sequence.

FIG. 5 shows the timing of groups 150, 152, 154, 156 of output pulse series from each of the four bus fibres 104, 106, 108, 110 (labelled A, B, C, D respectively in FIG. 4) in response to a single interrogating pulse pair in the case where the delay coils 113, 114, 115 have zero length. The origin of time in FIG. 5 is taken as the time when a portion of the first of a pair of interrogating input pulses returns from package AX. The output sequence from bus fibre A consists of a series of 16 pulses; a particular pulse j=1 . . . 16) of these pulses returns at a time (j−1)$\tau$ later than the first pulse. Since packages AX, AY, AZ are spaced along bus fibre A at intervals of 200 m=5c$\tau$ (corresponding to a round-trip delay of 2 μs), the sixth pulse of the output pulse series of package AX overlaps with the first pulse of the output pulse series from package AY, and the sixth pulse of the output pulse series output from package AY overlaps with the first pulse of the output pulse series from package AZ. Individual output pulses in the group 150 of output series are labelled to indicate which individual sensing coil they correspond to, e.g. AX3 indicates a pulse carrying information from the third sensing coil of package AX. The groups 152, 154, 156 of output pulse series from bus fibres B, C and D have the same format as those output from bus fibre A, however they are delayed by 500 ns, 1000 ns and 1500 ns respectively with respect to the group 150 from bus fibre A because the packages on bus fibres B, C, and CD are offset with respect to those on bus fibre A by distances of 50 m, 100 m and 150 m respectively along the line array of packages.

If delays coils 113, 114, 115 incorporated in bus fibres A, B and C respectively of the array 100 have lengths 120 m, 80 m and 40 m respectively, groups 150, 152, 154 of output pulse series from bus fibres A, B and C are delayed by 1200 ns (3$\tau$), 800 ns (2$\tau$) and 400 ns($\tau$) respectively, these delays being indicated in FIG. 5. Groups 152, 154, 156 of output pulse series from bus fibres B, C and D therefore become delayed by 100 ns ($\tau/4$), 200 ns ($\tau/2$) and 300 ns (3$\tau/4$) respectively with respect to group 150 from bus fibre A.

Referring to FIG. 6, the delays introduced by delay coils 112, 114, 116 result in a multiplexed output sequence 160 in the array i/o fibre 102 in which groups 150, 152, 154, 156 of output pulse series from bus fibres A, B, C, D are interleaved to form three continuous blocks 170, 172, 174 of useful (i.e. data-carrying) output pulses, each of duration 4τ=1600 ns, and four periods 162, 164, 166, 168, each of duration τ=400 ns, which contain pulses from the first and/or last fibre-coupled reflectors of certain packages, and hence no useful information. Blocks 170, 172, 174 are arranged such that output pulses corresponding to sensing coils having the same position in each of the packages within a particular cluster are grouped contiguously in time. Since the period 168 contains no useful information, the array 100 may be interrogated at a rate $1/15\tau \approx 167$ kHz in order to generate continuous output from the array 100; this is also the rate at which multiplexed output sequences are output from the array i/o fibre 102.

Other embodiments of the invention may be obtained by modifying the array 100 of FIG. 4 so that the distances $\Delta x_1$, $\Delta x_2$, $\Delta x_3$ have values other than 50 m, 100 m, and 150 m. The lengths of the delay coils 112, 114 and 116 then need to be adjusted so that their respective lengths remain equal to $\Delta x_3$-$3c\tau/8$, $\Delta x_2$-$c\tau/4$ and $\Delta x_1$-$c\tau/8$ respectively. A particular embodiment in which the packages on bus fibres B, C, and D are offset by desired distances $\Delta x_1$, $\Delta x_2$, $\Delta x_3$ from those on bus fibre A may therefore be obtained simply by making appropriate choices for the lengths of the delay coils 112, 114, 116. Further embodiments of the invention may also be obtained by modifying the array 100 so that individual sensing coils of each package have a length other than 40 m; if the length of a coil is l then the duration τ of interrogating pulses must be adjusted so that τ remains equal to 2l/c.

Referring to FIG. 7, a second example fibre-optic sensor array of the invention is indicated generally by 200. Parts of the array 200 which correspond to parts of the array 100 of FIG. 4 are labelled with reference numerals having a value 100 greater than the reference numerals labelling the corresponding parts of the array 100. Adjacent packages coupled to a given bus fibre have a separation of 800 m, compared to 200 m in the array 100 of FIG. 4. The physical layout of the array 200 is similar to that of the array 100 shown in FIG. 4A, i.e. individual packages form a line array with bus fibres of the array 200 extending along the length of the line array. Each of the packages of the array 200 has the structure shown in FIG. 1.

Figure 8:
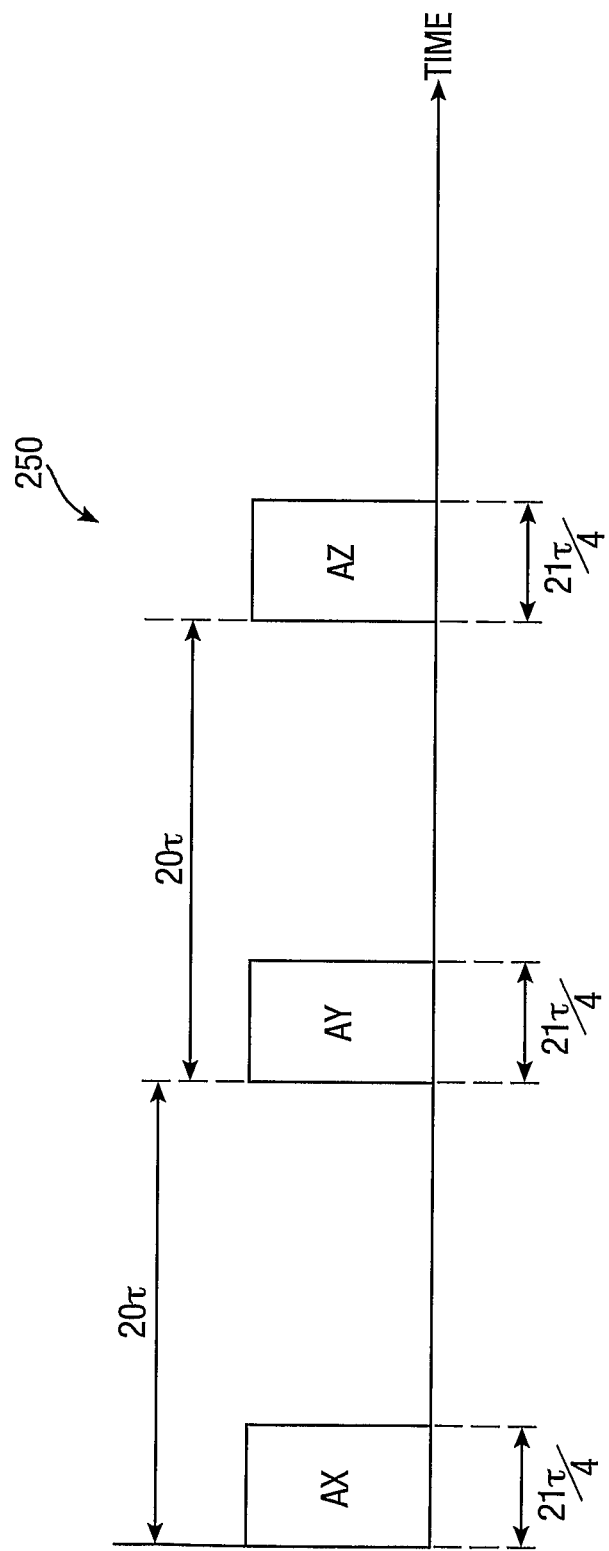
FIG. 8 shows a group of three output pulse series obtainable from a bus fibre of the FIG. 7 array in response to input of a single interrogating pulse pair.

FIG. 8 shows a group 250 of output pulse series of bus fibre A of the array 200 resulting from input of a single interrogating pulse pair having the form shown in FIG. 2. The origin of time is the time at which the first pulse 20 of the interrogating pair returns from the position AX. Each of the packages AX, AY, AZ generates an output pulse series of six optical output pulses as shown in FIG. 3. The three output pulse series are indicated by AX, AY and AZ in FIG. 8 (the structures of the series are not shown). Each output pulse series AX, AY, AZ has duration 2l/4=2.1 µs as indicated in FIG. 3. The delay between consecutive output pulse series is 20τ=8 µs because the packages AX, AY, AZ are spaced apart by 800 m of bus fibre.

Figure 9:
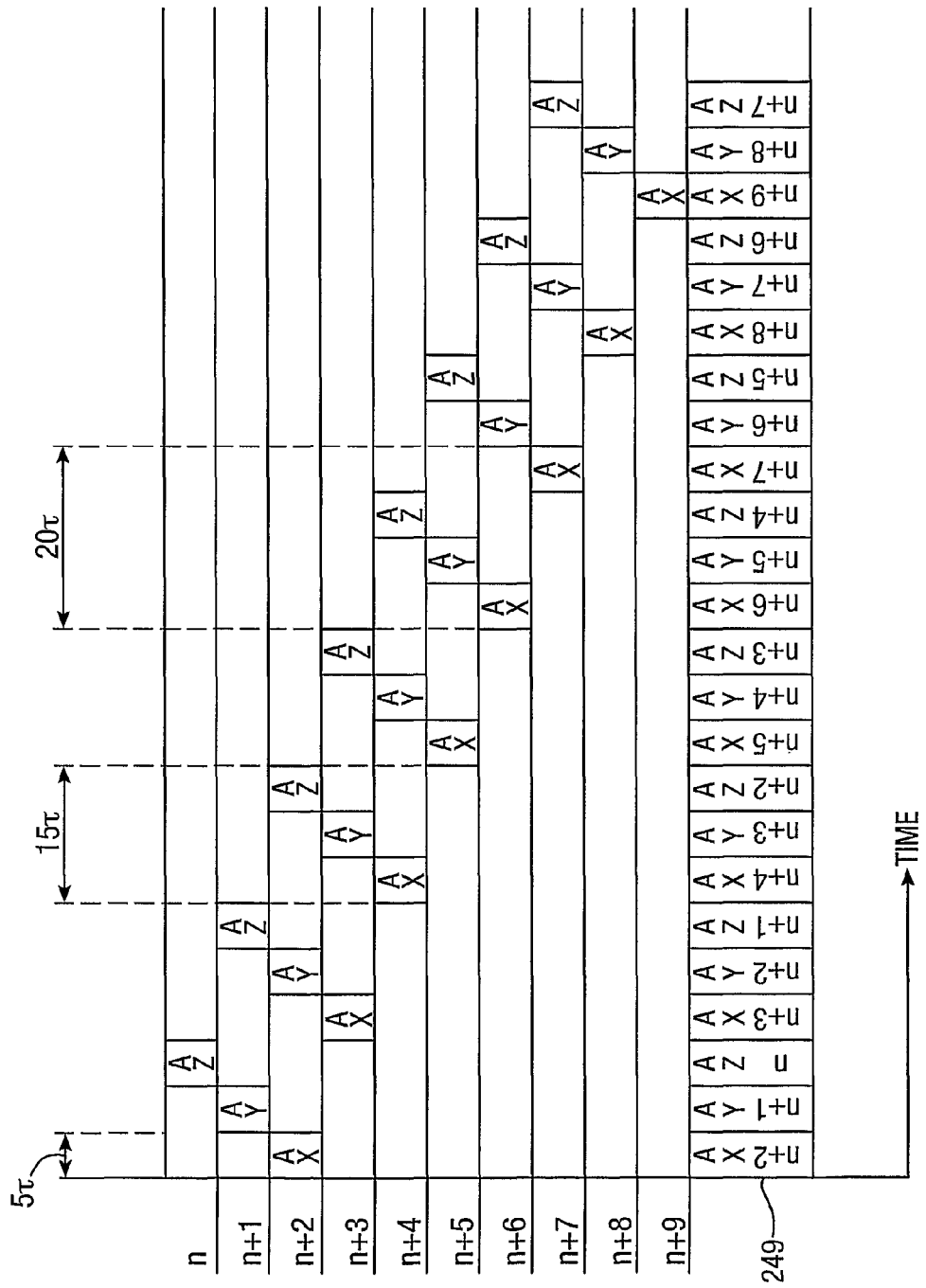
FIG. 9 shows a group of output pulse series obtainable from a bus fibre of the FIG. 7 array in response to repeated interrogation of that bus fibre.

FIG. 9 shows a group 249 of output pulse series from bus fibre A when continuously interrogated by pulse pairs of the form shown in FIG. 2 at a rate $1/15\tau$. The group 249 is made up of output pulse series from the packages AX, AY, AZ generated by a series of consecutive interrogating pulse pairs n, n+1, n+2, . . . n+9. The origin of time is the time when the first pulse of pair n+2 returns from package AX. Since the delay between consecutive output pulse series resulting from a particular interrogating pulse pair is 20τ, and since the last τ/4 of each series contains no useful output, there exists the possibility of interleaving three other output pulse series, generated by other interrogating pulse pairs, between consecutive output pulse series generated by a single interrogating pulse pair. Thus for example, in the group 249 of output pulse series, the following output pulse series appear between the output pulse series of packages AX and AY generated by the (n+2)th interrogating pulse pair:

- an output pulse series from package AY generated by the (n+1)th interrogating pulse pair
- an output pulse series from package AZ generated by the nth interrogating pulse pair, and
- an output pulse series from package AX generated by the (n+3)th interrogating pulse pair.

Interleaving of output pulse series generated by different interrogating pulse pairs allows a higher sampling rate than would be the case if the output pulse series from the last package coupled to the bus fibre generated by a particular interrogating pulse pair were to be received before the output pulse series from the first package generated by the next interrogating pulse pair.

Figure 10:
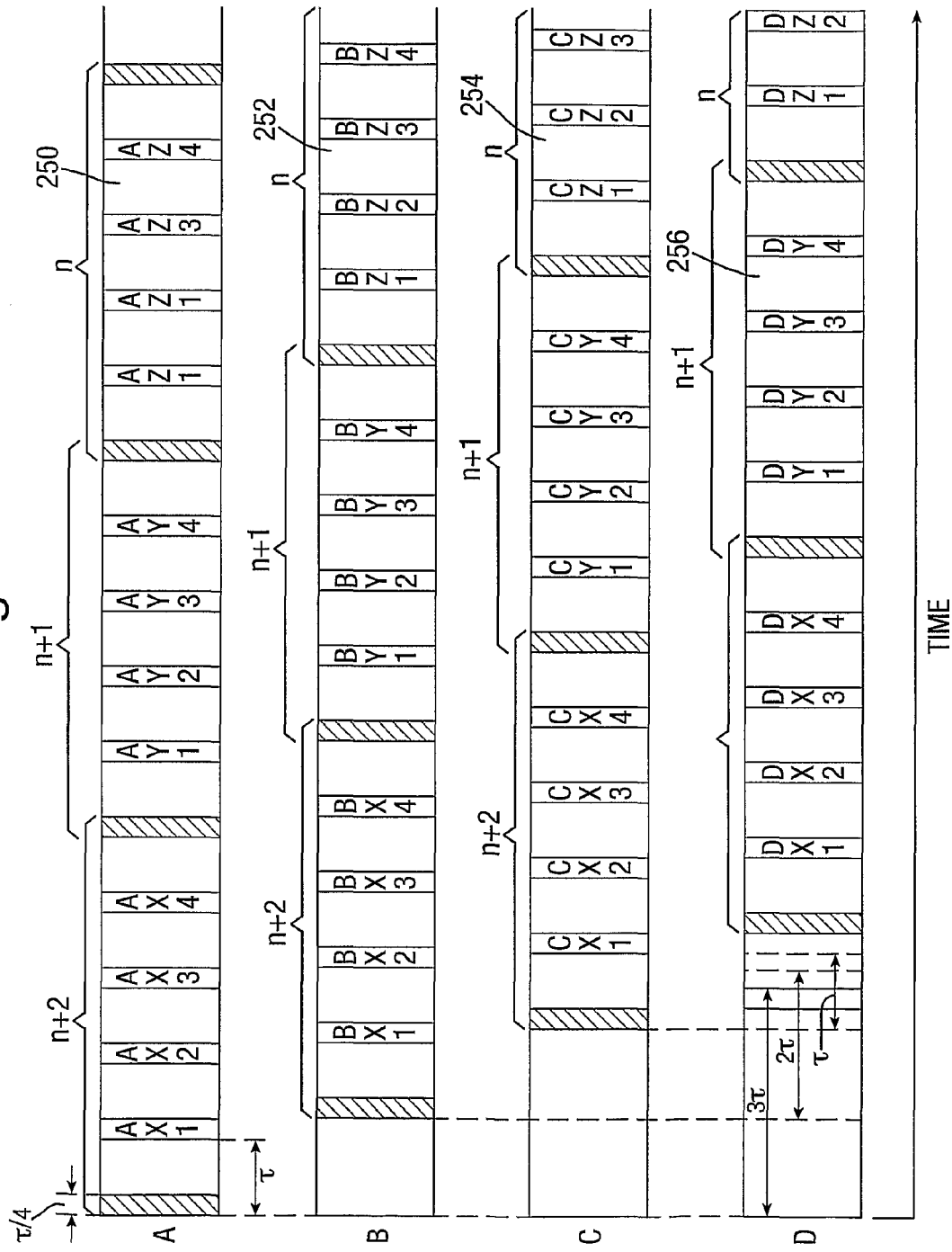
FIG. 10 shows the timing of groups of output pulse series from bus fibres of the FIG. 7 array in the case where delay coils of the array have zero length.

FIG. 10 shows the timing of groups 250, 252, 254, 256 of output pulse series from the four bus fibres 204, 206, 208, 210 (labelled A, B, C and D respectively in FIG. 7) output in response to consecutive interrogating input pulse pairs n, n+1, n+2 in the case where the delay coils 212, 214, 216 have zero length. The origin of time in FIG. 7 is taken as the time when a portion of the first pulse of interrogating pulse pair n+2 returns from package AX. Groups 252, 254, 256 are delayed by 500 ns, 1000 ns and 1500 ns respectively with respect to group 250 because the packages coupled to bus fibres B, C and D are displaced along the array 200 by distances of 50 m, 100 m and 150 m respectively with respect to corresponding packages coupled to bus fibre A.

Delays coils 212, 214, 216 incorporated into bus fibres A, B, and C respectively of the array 200 delay the groups 250, 252, 254 of output pulse series from those branches by 3τ, 2τ, and τ respectively. (Delays coils 212, 214 and 216 therefore have lengths of 120 m, 80 m and 40 m respectively.) The groups 252, 254, 256 of output pulse series from bus fibres B, C and D respectively therefore become delayed by τ/4, τ/2 and 3τ/4 respectively (i.e. by 10 ns, 200 ns and 300 ns respectively) with respect to the group 250 of output pulse series from bus fibre A.

Figure 11:
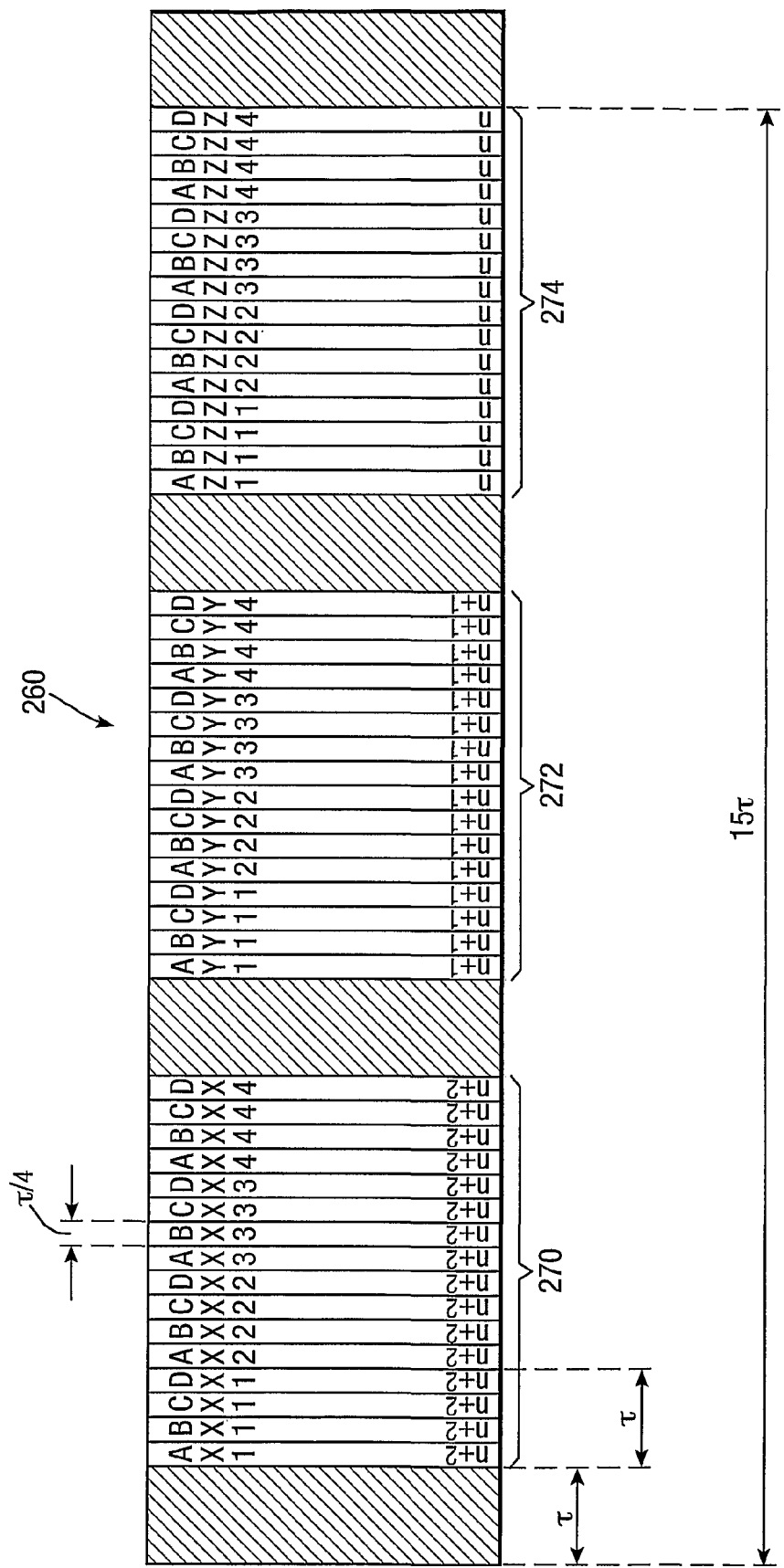
FIG. 11 shows a multiplexed output sequence obtainable from the FIG. 7 array when delay coils of the array have suitable lengths.

FIG. 11 shows one complete cycle 260 of a multiplexed output sequence which is output from the array i/o fibre 202 of the array 200. The cycle 250 has the same basic structure as the cycle 160 in FIG. 6; there is a difference only in that individual blocks 270, 272, 274 of useful data are generated by consecutive interrogating pulse pairs rather than by a single interrogating pulse pair. The sampling rate of the array 200 is $1/15\tau$ (equal to the rate at which interrogating pulse pairs are introduced into the array i/o fibre 202).

The distances by which packages coupled to bus fibre B, C and D are offset along the length of the array 200 with respect to those coupled to bus fibre A may take any desired value, however the lengths of the delays coils must then be adjusted as described above in relation to the array 100.

Figure 12:
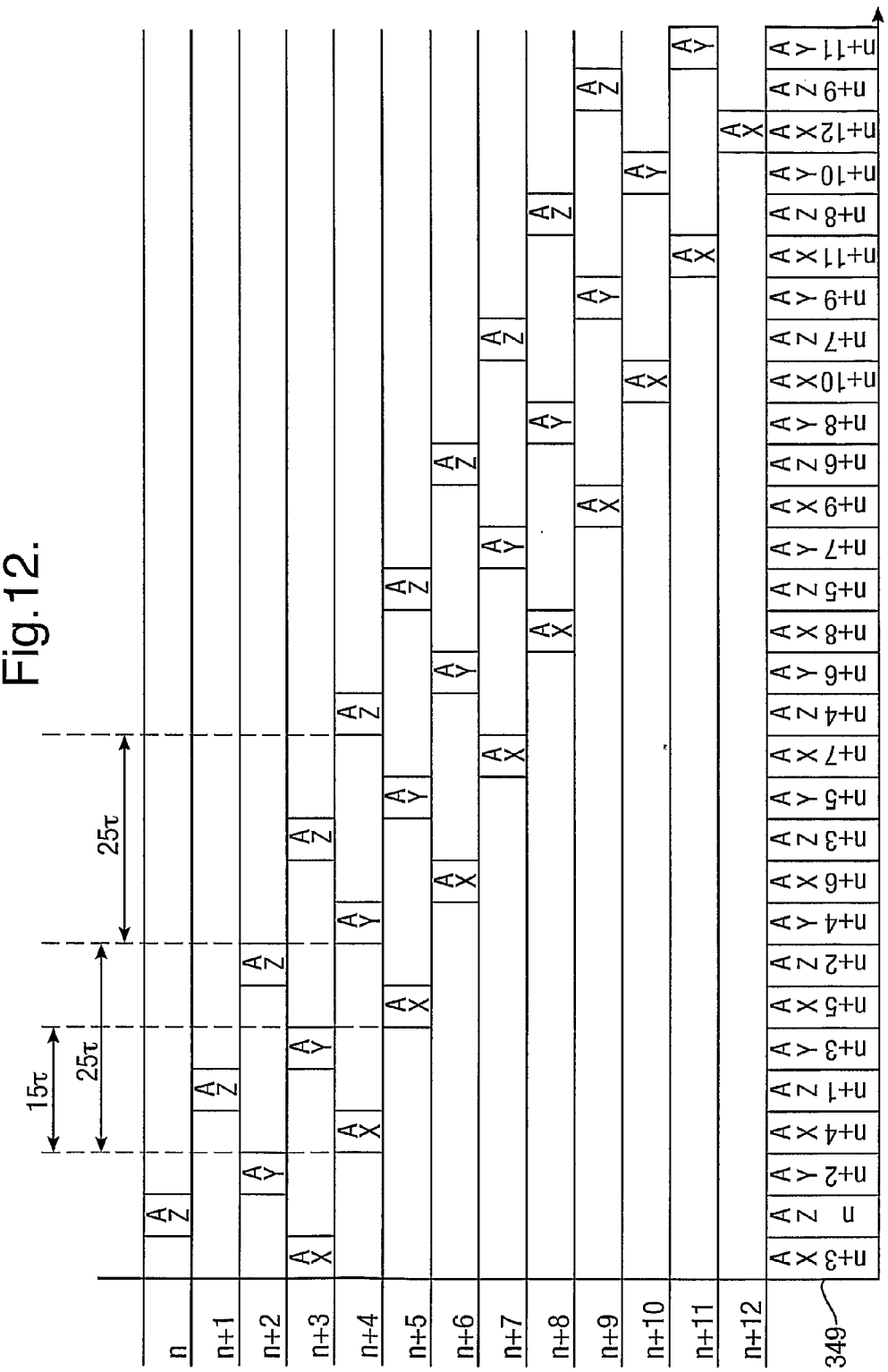
FIG. 12 shows a group of output pulse series obtainable from a bus fibre of another array of the invention in response to repeated interrogation of that bus fibre.
Figure 13:
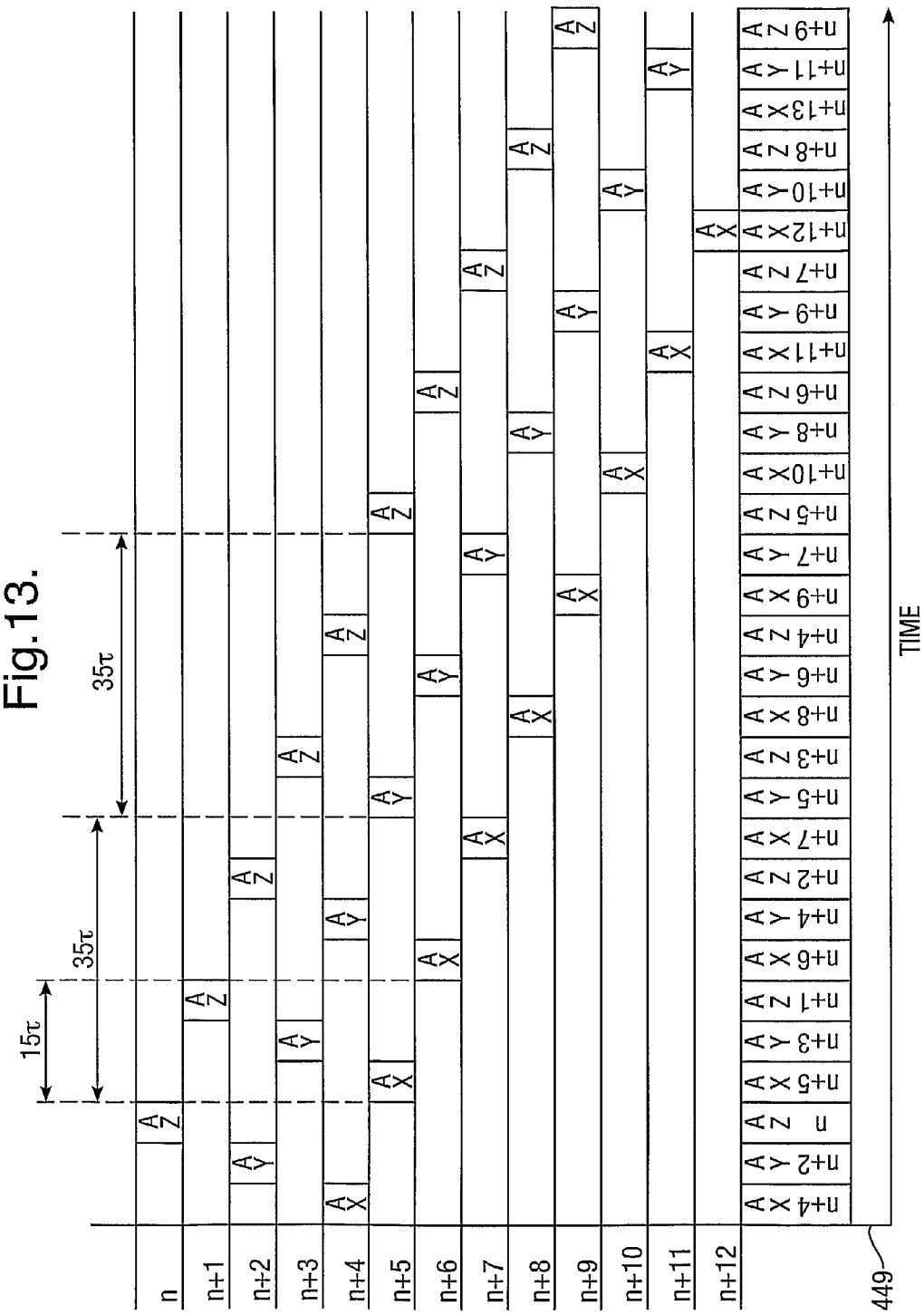
FIG. 13 shows a group of output pulse series obtainable from a bus fibre of a further array of the invention in response to repeated interrogation of that bus fibre.

Referring again to FIG. 9, interleaving of groups of output pulse series output onto bus fibre A and arising from different interrogating pulse pairs is possible because the separation of adjacent packages coupled to a given bus fibre is 800 m. This provides a delay of 20τ between consecutive output pulse series generated by a particular interrogating pulse pair. Since the useful information within each output pulse series occurs within the first 5, of each series, the delay of 20τ provides a time window of 15τ which may be used to accommodate three other output pulse series (3×5τ). Other schemes are possible. For example, FIG. 12 shows a group 349 of output pulse series obtainable from a single bus fibre having three packages AX, AY, AZ coupled along it at intervals of 1000 m when interrogated at a repetition frequency $1/15\tau$. The group 349 is made up of output pulse series generated by 13 consecutive interrogating pulse pairs n, n+1, n+2, . . . n+12. FIG. 13 shows a group 449 of output pulse series obtainable from a single bus fibre having three packages AX, AY, AZ coupled along it with a spacing of 1400 m between packages. The rate of interrogation is $1/15\tau$. In general terms if each bus fibre has q packages coupled to it, and if the duration of useful output in an output pulse series from a single package is T (taking the first pulse in a series to be 'useful' for this purpose, but not the last pulse) then it is possible to interrogate the array using a sampling period qT to obtain contiguous output pulse series from each bus fibre, provided the length x of fibre between adjacent packages coupled to a bus fibre is such that $2x/c=sT$, where $s=rq+1$ and r is an integer. r=0 represents the trivial case where $2x/c=T$ and output pulse series from a branch generated by a particular interrogating pulse pair are contiguous. Solutions for r=1 and r=2 are illustrated in FIGS. 9 and 13 respectively. There are also some possible combinations of s, r and q that do not meet the condition s=rq+1; one of these is illustrated in FIG. 12.

Although FIGS. 9, 12 and 13 relate to packages separated by bus fibre lengths of 800 m, 1000 m and 1400 m respectively, there is flexibility in the choice of physical package separation because additional delay coils may be employed between packages on a bus fibre in order to give a desired delay between output pulse series of the bus fibre generated by a particular interrogating pulse pair. For example, adjacent packages coupled to a bus fibre of the array 200 of FIG. 7 are connected by an 800 m length of bus fibre, but if a physical separation of only 700 m was required, two 100 m delay coils could be employed to give the timing scheme of FIG. 9: one coil between packages AX and AY and the other between packages AY and AZ. If the desired physical package separation was 1100 m, two 300 m delay coils could be used to allow the timing scheme of FIG. 12 to be employed.

The array 200 of FIG. 7 could also be interrogated by introducing interrogating pulse pairs to the array i/o fibre 202 at a rate which is low enough to allow output pulse series from all the packages of the array, which are generated in response to a particular pulse pair, to be retrieved before the next interrogating pulse pair is introduced. Although delay coils could be used to interleave groups of output pulse series coupled onto the different bus fibres, the maximum interrogation rate would be $1/45\tau \approx 55$ kHz. Furthermore, no output from the array would be received for $\approx 61\%$ of each sample period.

Figure 14:
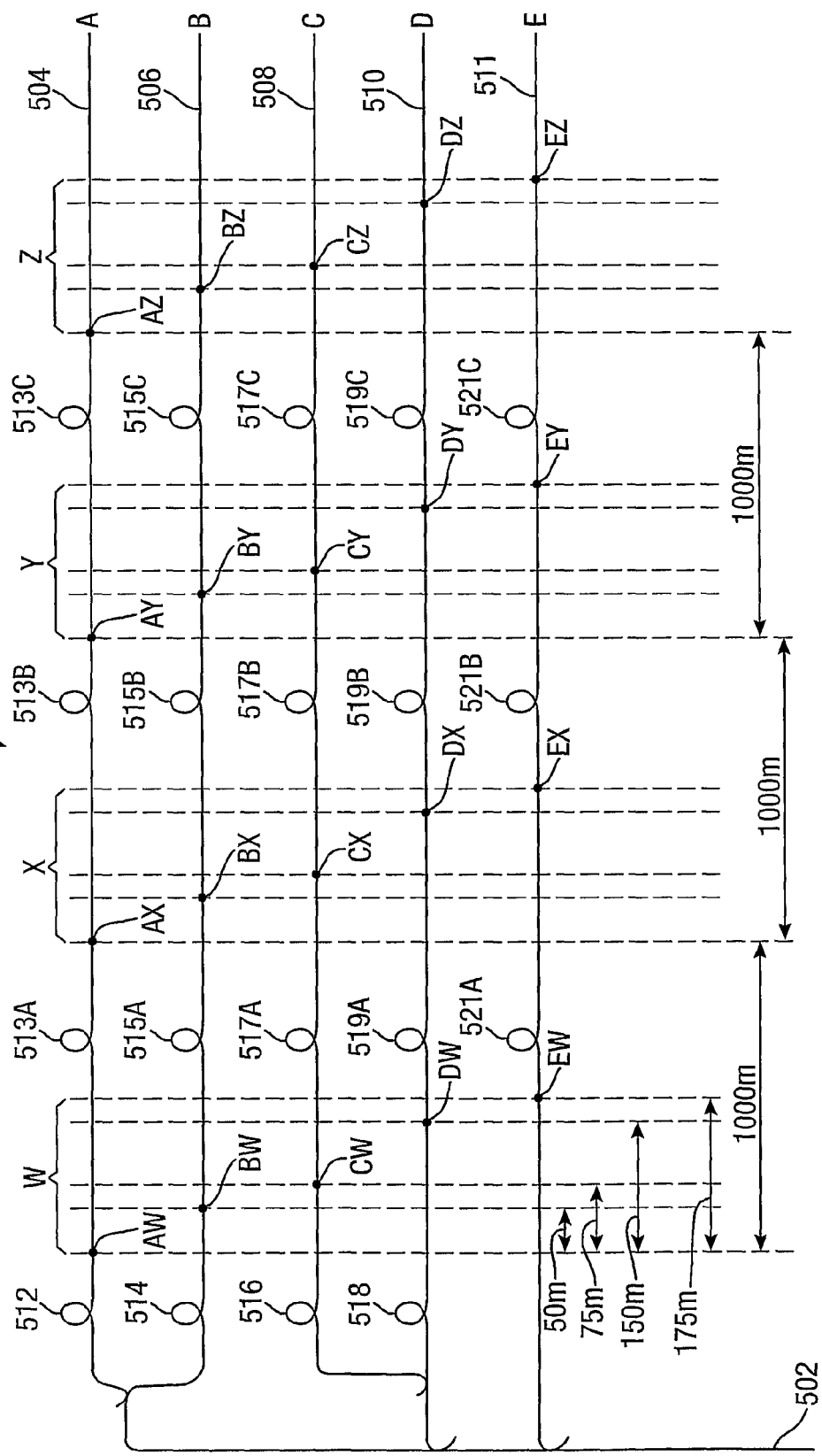
FIG. 14 schematically illustrates a third example fibre-optic sensor array of the invention.

To illustrate how the above ideas may be easily extended to cover arrays having greater numbers of bus fibres and packages per branch, as well as more complex packages, FIG. 14 shows another fibre-optic sensor array 500 of the invention comprising five bus fibres 504, 506, 508, 510, 511 (labelled A, B, C, D, E respectively) each of which has four packages coupled to it. The array 500 therefore has 20 packages AW, AX, . . . EY, EZ. Each package comprises five (sic) sensing coils, each having a length of 40 m. The packages are arranged into four clusters W, X, Y, Z each having five packages (one coupled to each of the five bus fibres A, B, C, D, E). The physical separation of adjacent packages coupled to any given bus fibre is 1000 m. Packages coupled to bus fibres B, C, D and E are displaced along the array 500 by distances of 50 m, 75 m, 150 m and 175 m respectively with respect to corresponding packages coupled to bus fibre A. Delay coils 512, 514, 516, 518 have lengths of 143 m, 101 m, 84 m and 17 m respectively. Delays coils 513A, B & C, 515A, B & C, 517A, B & C, 519A, B & C, 521A, B & C each have a length of 200 m. The physical layout of the array 500 is similar to that shown in FIG. 4A; individual packages of the array are arranged in a line array with bus fibres extending along the length of the line array. The bus fibres are preferably house in a protective cable.

Figure 15:
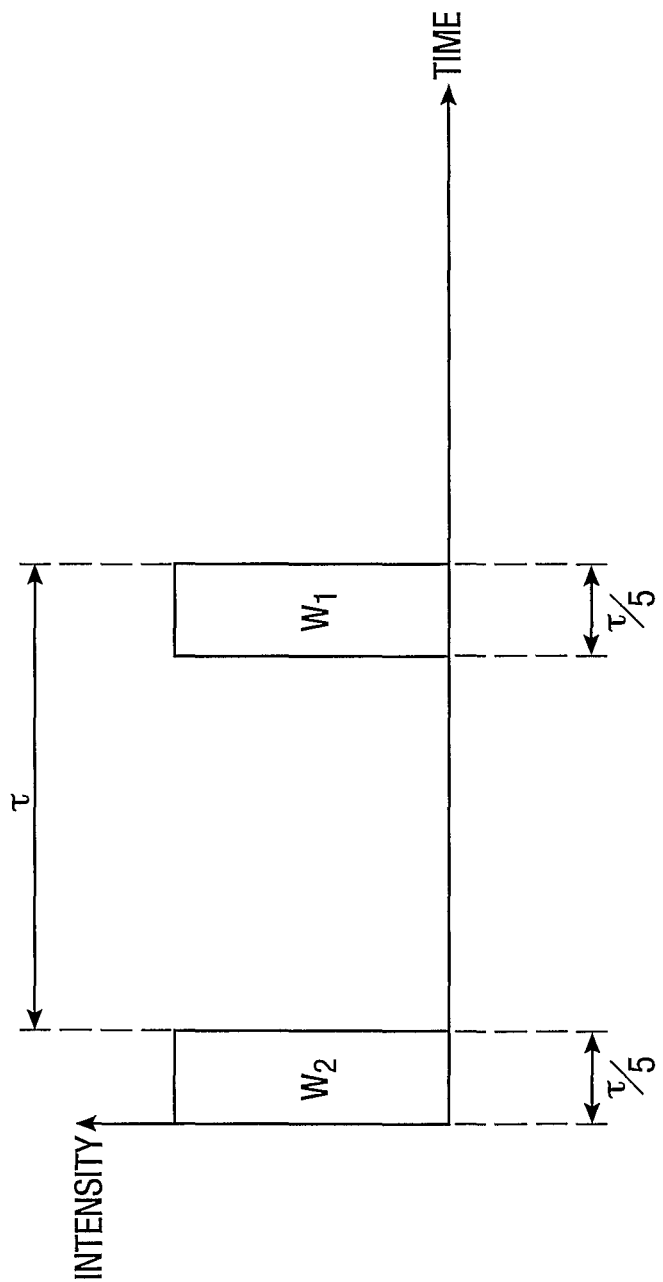
FIG. 15 shows a pair of input pulses suitable for interrogating the FIG. 14 array.
Figure 16:
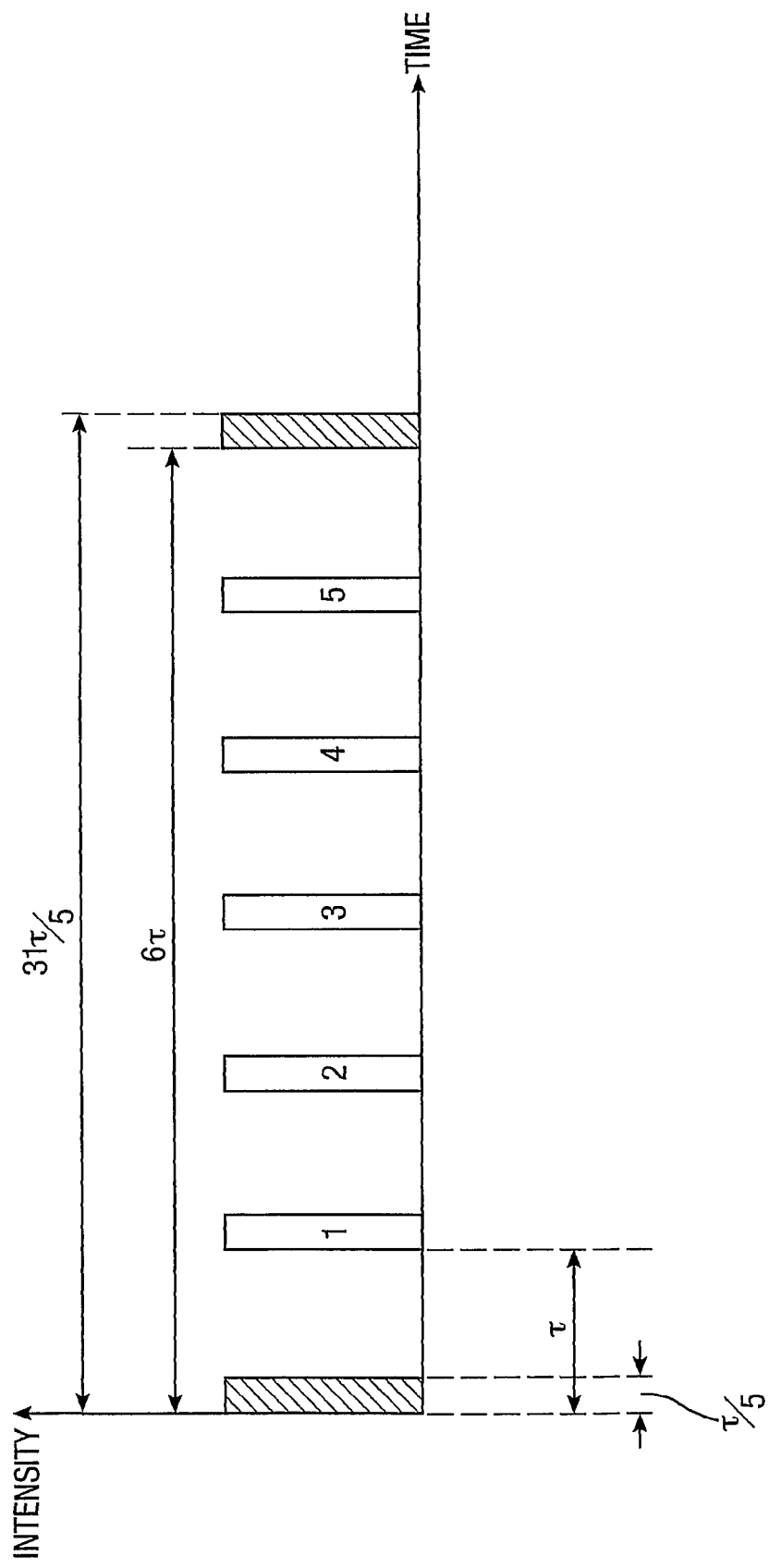
FIG. 16 shows an output pulse series obtainable from a package of the FIG. 14 array in response to input of the pulse pair of FIG. 15.

Interrogation of the array 500 is performed by introducing interrogating pulse pairs of the form shown in FIG. 15 into the array i/o fibre 502 of the array 500. The delay between individual pulses of a pair is $\tau=2\times 40/c=400$ ns, and since there are five bus fibre in the array 500, the width of the individual interrogating pulses is $\tau/5$. FIG. 6 shows an output pulse series of seven pulses output by a single package in response to a single interrogating pulse pair. The duration of the output pulse series is $31\tau/5$.

Figure 17:
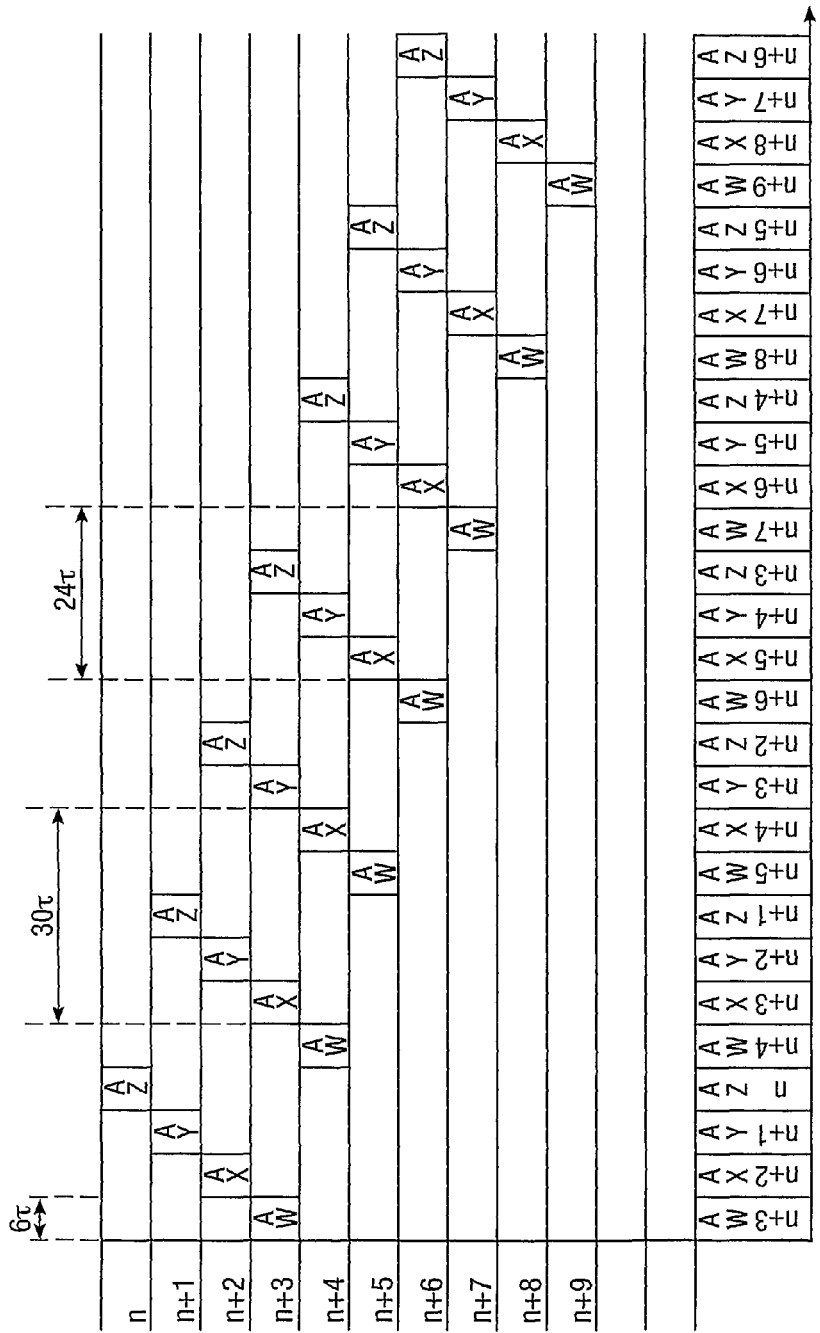
FIG. 17 shows a group of output pulse series obtainable from a bus fibre of the FIG. 14 array in response to repeated interrogation of that bus fibre.

FIG. 17 shows a timing scheme for interleaving output series coupled onto bus fibre A, the output pulse series being generated by ten consecutive interrogating pulse pairs n, n+1, n+2, . . . n+9. The same scheme is used for the other bus fibres. The 200 m delay coils 513, 515, 517, 519, 521, together with the physical cluster separation of 1000 m results in a delay of $30\tau$ between consecutive output pulse series from a particular bus fibre and generated by a single interrogating pulse pair. Contiguous output pulse series are output from a bus fibre in response to interrogation at a rate $1/24\tau=104$ kHz.

Figure 18:
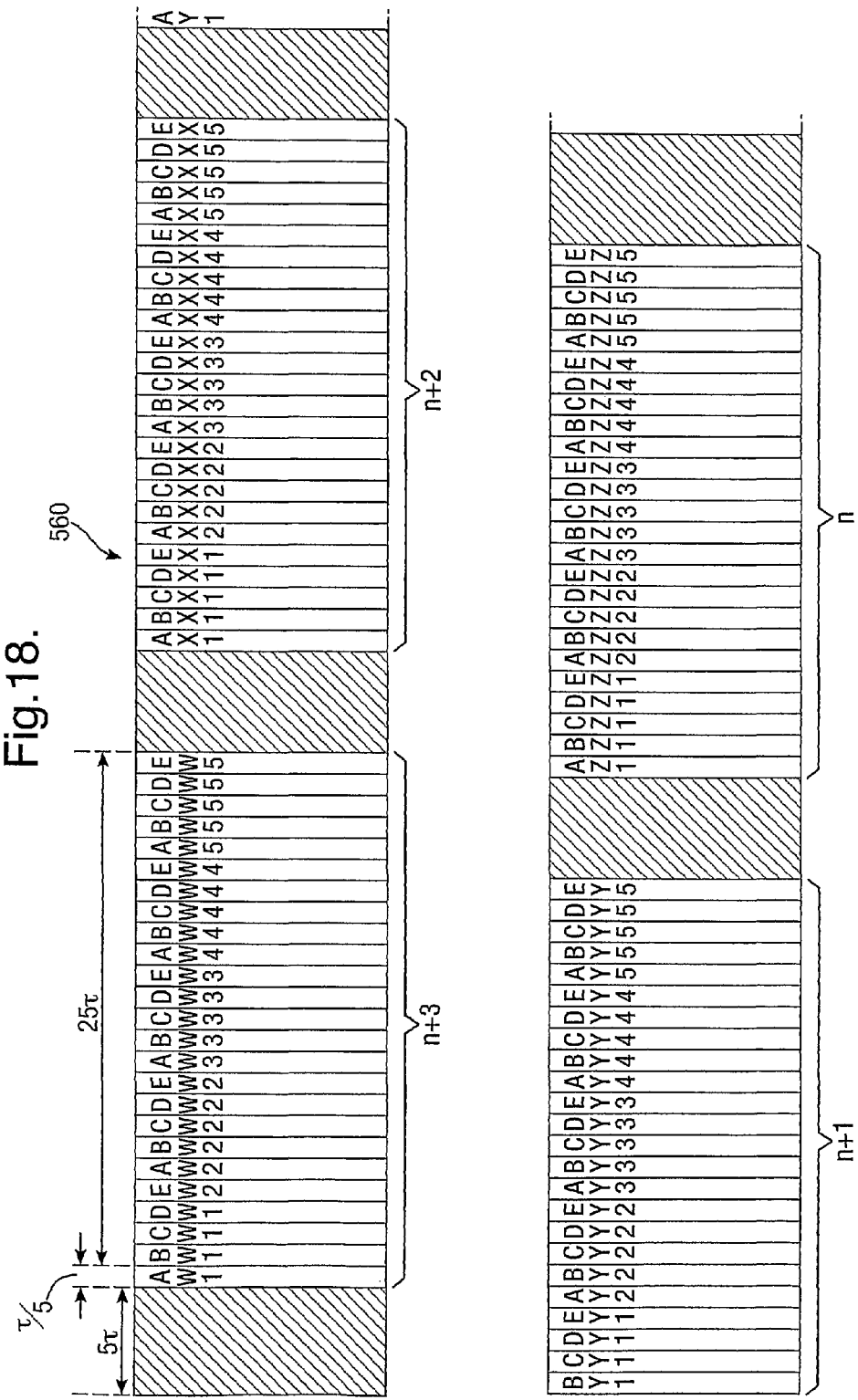
FIG. 18 shows a multiplexed output sequence obtainable from the FIG. 14 array when delay coils of the array have suitable lengths.

FIG. 18 shows a complete cycle 560 of a multiplexed output sequence of the array 500, the cycle 560 being generated by four consecutive interrogating pulse pairs n, n+1, n+2, n+3. The duration of the cycle is 24τ, hence the output rate of the array 500 is 104 kHz.

It will be understood that the present invention has been described above purely by way of example, and modification of detail can be made within the scope of the invention.

Each feature disclosed in the description, and (where appropriate) the claims and drawings may be provided independently or in any appropriate combination.

The invention claimed is:

1. A fibre-optic sensor array comprising a line array of fibre-optic sensor packages each having a package input/output (i/o) fibre and each being arranged to output a finite output pulse series of optical output pulses via its package i/o fibre in response to input thereto of one or more interrogating optical pulses and wherein the array comprises N fibre-optic bus fibres extending in parallel along the length of the line array, each package i/o fibre being optically coupled to one of said N bus fibres at a respective position along the line array such that individual pulses within an output pulse series from corresponding packages coupled to different bus fibres are interleaved in the array i/o fibre.

2. A fibre-optic sensor array according to claim 1, wherein the package i/o fibre of the nth fibre-optic sensor package of the line array is optically coupled to the kth bus fibre (k=1 to N) if n/N=M+k/N, and M is a positive integer or zero.

3. A fibre-optic sensor array according to claim 2 wherein positions along a given bus fibre at which package i/o fibres are coupled thereto are separated by equal lengths of bus fibre, and at least one bus fibre incorporates a respective delay length of optical fibre between the array i/o fibre and the position along the bus fibre at which the package i/o fibre of the first package of that bus fibre is coupled.

4. A fibre-optic sensor array according to claim 3 wherein each of the fibre-optic sensor packages is arranged to output optical pulses of an output pulse series at a rate $1/\tau$, each pulse having a duration $\tau/N$, and wherein the one or more delay lengths of fibre are such that, in use of the array, groups of output pulse series coupled into respective bus fibres form a multiplexed output sequence in the array i/o fibre, the sequence comprising a plurality of said groups in which consecutive groups have a relative delay $\tau/N$.

5. A fibre-optic sensor array according to claim 4 wherein each fibre-optic sensor package of the array is arranged to output an output pulse series of m optical output pulses in response to one or more interrogating pulses and wherein said equal lengths of bus fibre have a length $cpm\tau/2$, where p is an integer, $p \geq 1$ and c is the speed of light in fibre.

6. A fibre-optic sensor array according to claim 5 wherein at least one of said equal lengths of fibre incorporates a delay length of optical fibre.

7. A fibre-optic sensor array according to claim 4 wherein each fibre-optic sensor package of the array is arranged to output an output pulse series of m optical output pulses in response to one or more interrogating pulses and wherein said equal lengths of fibre have a length $cp(m-1)\tau/2$, where p is an integer, $p \geq 1$ and c is the speed of light in fibre.

8. A fibre-optic sensor array according to claim 7 wherein at least one of said equal lengths of fibre incorporates a delay length of optical fibre.

9. A fibre-optic sensor array according to claim 7 wherein each fibre-optic sensor package comprises m-2 fibre-optic sensing coils arranged in series, each coil having a length $c\tau/2$, and wherein each of said coils is provided with a partial reflector on an input side thereof and wherein the package is provided with a terminal reflector.

10. A fibre-optic sensor array according to claim 9 wherein each reflector is a fibre-coupled reflector.

11. A fibre-optic sensor array according to claim 9 wherein each reflector is an in-fibre reflector.

12. A fibre-optic sensor array according to claim 9 wherein one or more fibre-optic sensing coils is comprised in a fibre-optic accelerometer.

13. A fibre-optic sensor array according to claim 9 wherein one or more fibre-optic sensing coils is comprised in a fibre-optic hydrophone.

14. A fibre-optic sensor array according to claim 9 wherein each package has four fibre-optic sensing coils, three coils being comprised in respective fibre-optic accelerometers and one coil being comprised in a fibre-optic hydrophone.

15. A fibre-optic sensor array according to claim 1 wherein the fibre-optic bus is contained within a protective cable extending along the length of the line array.

16. A large-scale fibre-optic sensor array comprising an i/o fibre and plurality of sub-arrays each according to claim 1, the large-scale array further comprising a wavelength multiplexer/demultiplexer arranged to couple radiation of a particular wavelength between the i/o fibre and a corresponding sub-array.

17. A sensor system comprising:
a linear array of fibre optic sensor packages, each package including at least one fibre optic sensor each being arranged to output a finite output pulse series of optical output pulses in response to input thereto of one or more interrogating optical pulses,
a fibre optic bus extending along the array comprising a plurality of N parallel bus fibres,
wherein the system is arranged such that physically adjacent packages of the array are always coupled to different ones of said N bus fibres such that individual pulses within an output pulse series from corresponding packages coupled to different bus fibres are interleaved.

18. A sensor system according to claim 17, wherein each package comprises q individual sensors, and outputs at least q+1 pulses in response to an input pulse.

19. A sensor system according to claim 17, in which each package comprises q individual sensors, and each bus has p packages optically coupled thereto, and in which each package is arranged to output optical pulses of an output pulse series at a rate $1/\tau$ wherein the rate of interrogation of the system is substantially $1/(\tau p(q+1))$.

* * * * *